United States Patent
Huang et al.

(10) Patent No.: US 7,264,373 B2
(45) Date of Patent: Sep. 4, 2007

(54) BACKLIGHT MODULE

(75) Inventors: Kuo-Tsun Huang, Tainan County (TW); Hsin-Cheng Hung, Tainan County (TW); Chung-Kuang Wei, Tainan County (TW)

(73) Assignee: Chi Mei Optoelectronics Corp., Tainan County, Taiwan (TW)

( * ) Notice: Subject to any disclaimer, the term of this patent is extended or adjusted under 35 U.S.C. 154(b) by 0 days.

(21) Appl. No.: 11/253,679

(22) Filed: Oct. 20, 2005

(65) Prior Publication Data

US 2006/0120108 A1    Jun. 8, 2006

(30) Foreign Application Priority Data

Dec. 6, 2004    (TW) .............................. 93137678 A

(51) Int. Cl.
*F21V 4/00* (2006.01)
(52) U.S. Cl. ...................... 362/219; 362/217; 362/225; 362/249
(58) Field of Classification Search ...................... None
See application file for complete search history.

(56) References Cited

U.S. PATENT DOCUMENTS

| | | | |
|---|---|---|---|
| 6,913,366 B2 * | 7/2005 | Lee | 362/628 |
| 7,055,985 B2 * | 6/2006 | Chou et al. | 362/225 |
| 7,059,754 B2 * | 6/2006 | Lekson et al. | 362/545 |
| 7,131,742 B2 * | 11/2006 | Moon | 362/97 |
| 2002/0021564 A1 * | 2/2002 | Cho et al. | 362/97 |
| 2003/0035283 A1 * | 2/2003 | Lim | 362/97 |
| 2004/0257793 A1 * | 12/2004 | Wakabayashi | 362/31 |
| 2005/0002174 A1 * | 1/2005 | Min et al. | 362/31 |
| 2005/0083711 A1 * | 4/2005 | Wu et al. | 362/558 |
| 2005/0195619 A1 * | 9/2005 | Tseng | 362/561 |
| 2005/0265025 A1 * | 12/2005 | Jang et al. | 362/243 |
| 2006/0002106 A1 * | 1/2006 | Hong et al. | 362/224 |
| 2006/0006803 A1 * | 1/2006 | Huang et al. | 313/607 |
| 2006/0098454 A1 * | 5/2006 | Tseng et al. | 362/614 |

FOREIGN PATENT DOCUMENTS

JP    2004-55531    2/2004

* cited by examiner

*Primary Examiner*—Renee Luebke
*Assistant Examiner*—Kristen A Manskar

(57) ABSTRACT

A backlight module (BLM) including a bezel, at least a first lamp and at least a second lamp is provided. The bezel has a first lighe region and is arranged substantially in parallel to the top side of the bezel. The second lamp is positioned in the second light source region and is arranged substantially in parallel to the top side of the bezel. The second lamp corresponds to the first lamp.

24 Claims, 9 Drawing Sheets

BACKLIGHT MODULE

This application claims the benefit of Taiwan Application Ser. No. 093137678, filed Dec. 6, 2004, which is incorporated herein by reference in its entirety.

BACKGROUND OF THE INVENTION

1. Field of the Invention

The invention relates in general to a backlight module, and more particularly to a direct type backlight module using combined types of lamps.

2. Description of the Related Art

Due to features such as slim size, low weight, low power consumption and zero or near zero radiation pollution, liquid crystal displays (LCD) have been widely used recently. An LCD includes a display unit, a backlight module, and a housing having a bracket. The display unit includes a display panel, a circuit board capable of processing data signals and a plurality of tape carrier packages (TCPs) connected therebetween.

The backlight module positioned under the display unit provides a uniform light source to the display unit of the LCD. The light source can be an edge type backlight module or a direct type backlight module. Generally speaking, products for small applications, such as notebooks or mobile phones, normally use edge type light sources, e.g., CCFLs (cold cathode fluorescent lamps) or LEDs(light emitting diodes) together with an optical plate such as a light guide plate, a diffuser film or a light enhancing film disposed on the light source to improve the light uniformity and illumination efficiency. In a direct type backlight module, the light source is disposed under the LCD to produce a better source of light to the LCD. TV has a higher standard of requirements in terms of brightness and wide-view angle. Therefore, the direct type light sources will become the mainstream light sources for large-scaled monitors and TVs. Compared to an edge type light source, a direct type light source employs a larger number of lamps. However, the light of the direct type light source is projected right from underneath the LCD, and hence, the planar uniformity of the light can be achieved by a diffuser plate or a diffuser film without any light guide plate.

FIG. 1A shows an exploded, perspective view of a conventional direct type backlight module. Conventional direct type backlight module 10 includes a plastic housing 5, a bezel 11, a reflective sheet 12, a plurality of lamps 13, a diffuser plate 14, and a plurality of diffuser sheets 15. The lamp 13 can be a cold cathode fluorescent lamp (CCFL), for example. The bezel 11 has an accommodation recess formed therein. The reflective sheet 12 is disposed on the bottom of the accommodation recess and on the wall of the two lateral sides of the accommodation recess. The diffuser plate 14 and the diffuser film 15 are used to convert linear light sources produced from the CCFLs 13, arranged in parallel in the accommodation recess, into a planar light source. The reflective sheet 12 disposed inside the bezel 11, a metal film or an aluminum plate, for instance, reflects the stray light to the image displaying surface to enhance the overall light efficiency. The backlight module 10 is received in the plastic housing 5 first and then is assembled with the display unit (not shown in the diagram) to form an LCD.

FIG. 1B is a schematic top plan view, which shows the arrangement of lapms in the conventional backlight module. Generally speaking, the lamps 13 of a conventional backlight module are horizontally disposed on the reflective sheet 12 and are arranged in parallel to each other at a fixed interval. In the conventional backlight module, electrodes (not shown) at theends of the lamps 13 are connected to an inverter 16, which converts the DC voltage into an AC voltage to drive the lamps 13. When an external voltage is applied to the electrodes positioned on the two ends of each of the lamps 13, electrons released from the electrodes excite an inert gas, e.g. mercury, inside the lamp to emit UV radiation. When the UV radiation projected on the phosphor pasted on the inner side of the lamp, visible light is generated. Along with the fast growth in the liquid crystal electronic appliances, the demand for large-scaled LCDs also increases, requiring lamps of greater length.

However, horizontally disposed long lamps might be easily bent or ruptured due to gravity. Moreover, the accompanied problems of a greater temperature difference and more uneven distribution of mercury in long lamps all cause the luminance uniformity of the lamps to deteriorate. Furthermore, a bent and fragile lamp would result in unevenly distributed backlight, and severely jeopardizing the display quality of the LCD. Besides, because a long lamp requires a larger starting voltage and a larger operating voltage, not only the transformer for the inverter needs to be redesigned, but also a too large voltage difference between the two ends of the lamp would result in uneven luminance of the lamp. Therefore, how to develop a backlight module which has excellent display quality and is easy to be driven for a large-scaled monitor has become an imminent challenge nowadays.

SUMMARY OF THE INVENTION

It is therefore the object of the invention to provide a backlight module whose light source is formed by connecting several lamps side by side. According to the invention, each lamp has a shorter length so as to avoid the bending and rupture of the lamp due to gravity. Moreover, ascribed to a more evenly distributed mercury layer of the lamp disposed inside the backlight module of the invention and a smaller temperature difference and voltage difference between the two ends of the lamp, the uniformity of the luminance of the lamp is greatly improved.

According to an object of the invention, a backlight module including a bezel, at least a first lamp and at least a second lamp is provided. The bezel has a first light source region and a second light source region. The lateral side of the first light source region is connected to the lateral side of the second light source region side by side. The first lamp is positioned in the first light source region and is arranged substantially in parallel to the top side of the bezel. The second lamp is positioned in the second light source region and is arranged substantially in parallel to the top side of the bezel, the second lamps corresponds to the first lamps.

According to another object of the invention, a backlight module including a bezel, a plurality of lamp and the inverter is provided. The bezel has a plurality of bezel units arranged in matrix. Each of the lamps is respectively disposed on respective bezel unit. The inverter is disposed on the bezel and is electrically connected to the lamps to drive the lamps.

Other objects, features, and advantages of the invention will become apparent from the following detailed description of the preferred but non-limiting embodiments. The following description is made with reference to the accompanying drawings. Anyone who is skilled in related technology would be able to understand and implement the technology accordingly.

DETAILED DESCRIPTION OF THE PREFERRED EMBODIMENTS

The invention provides a backlight module having a light source formed by connecting several lamps side by side and/or end to end. The light source has a better luminance uniformity and the voltage driving efficiency is also improved when applied to a large-scaled monitor. The invention is exemplified by the embodiments disclosed below. However, the embodiments are not to limit the scope of protection of the invention.

First Embodiment

Figure 1A:
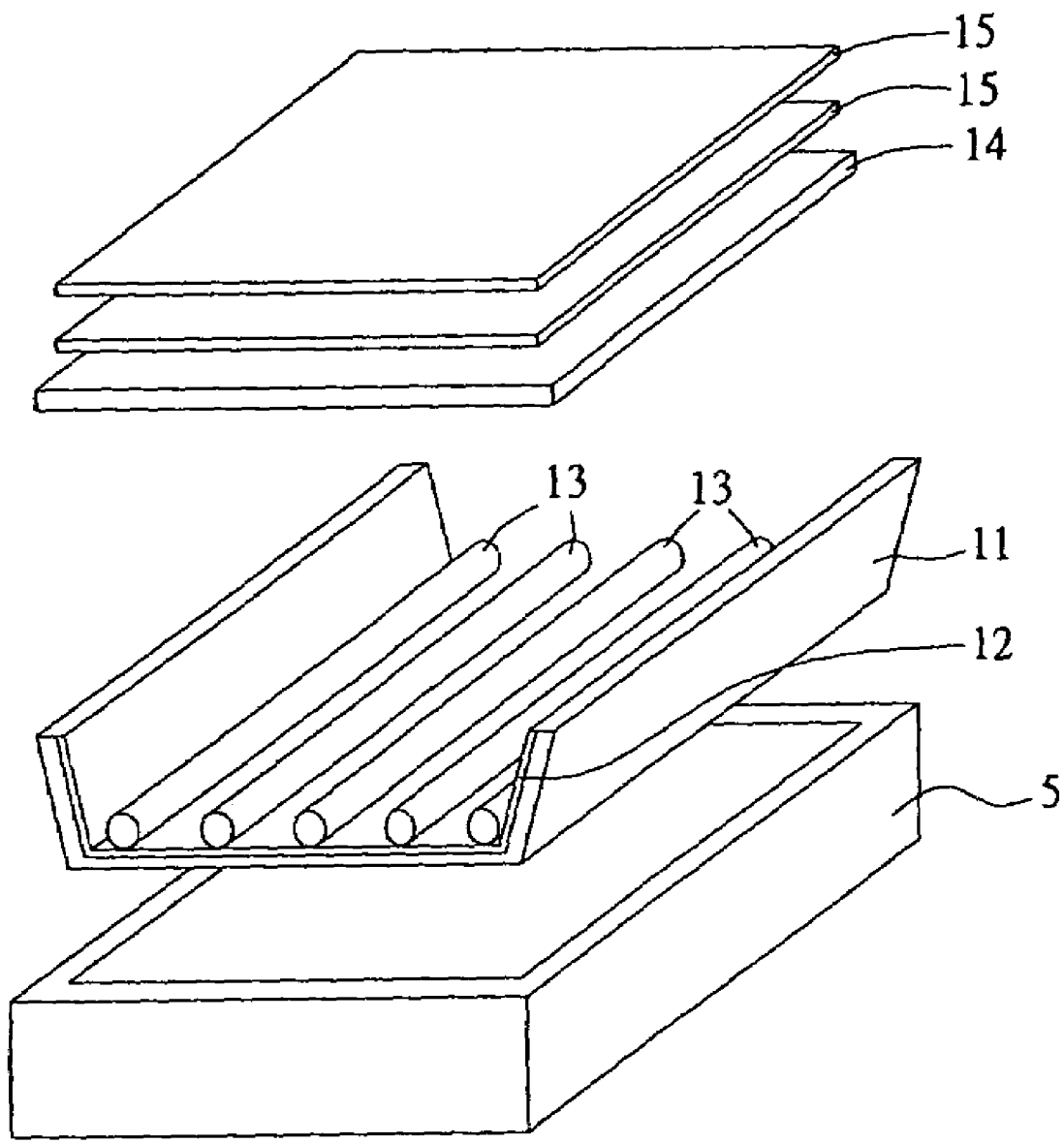
FIG. 1A is an exploded, perspective view of a conventional direct type backlight module.
Figure 1B:
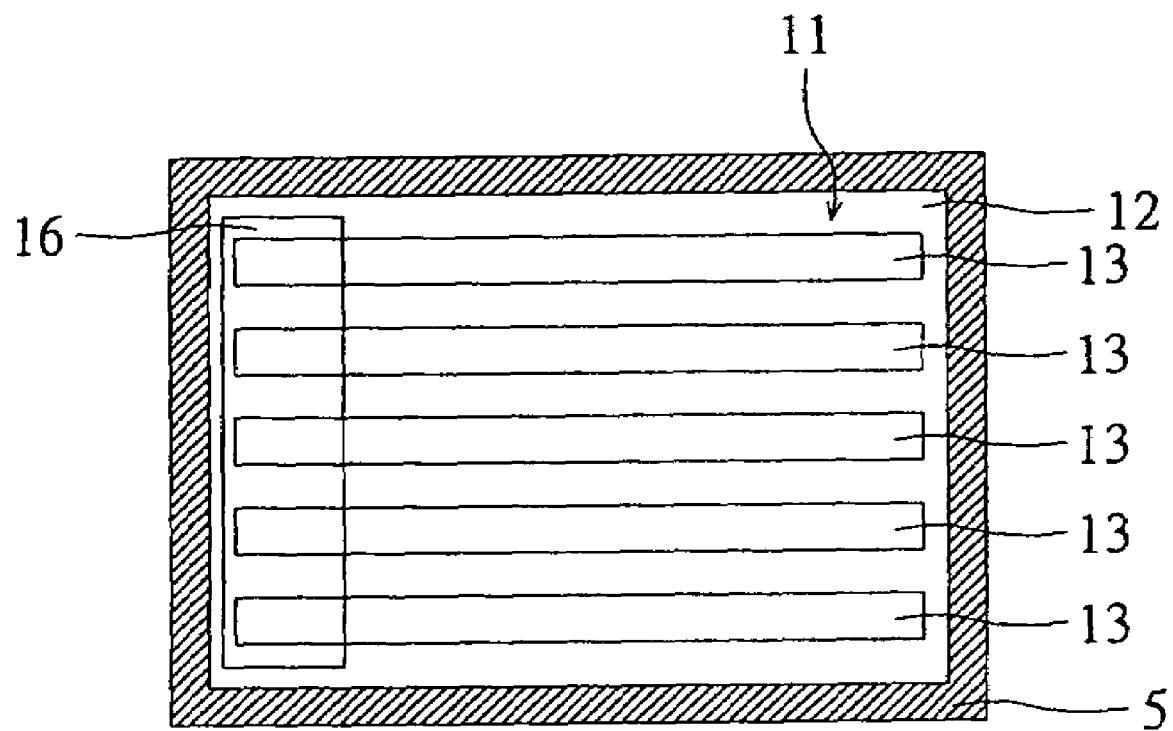
FIG. 1B is a schematic top plan view showing the arrangement of lamps in the conventional backlight module.
Figure 2:
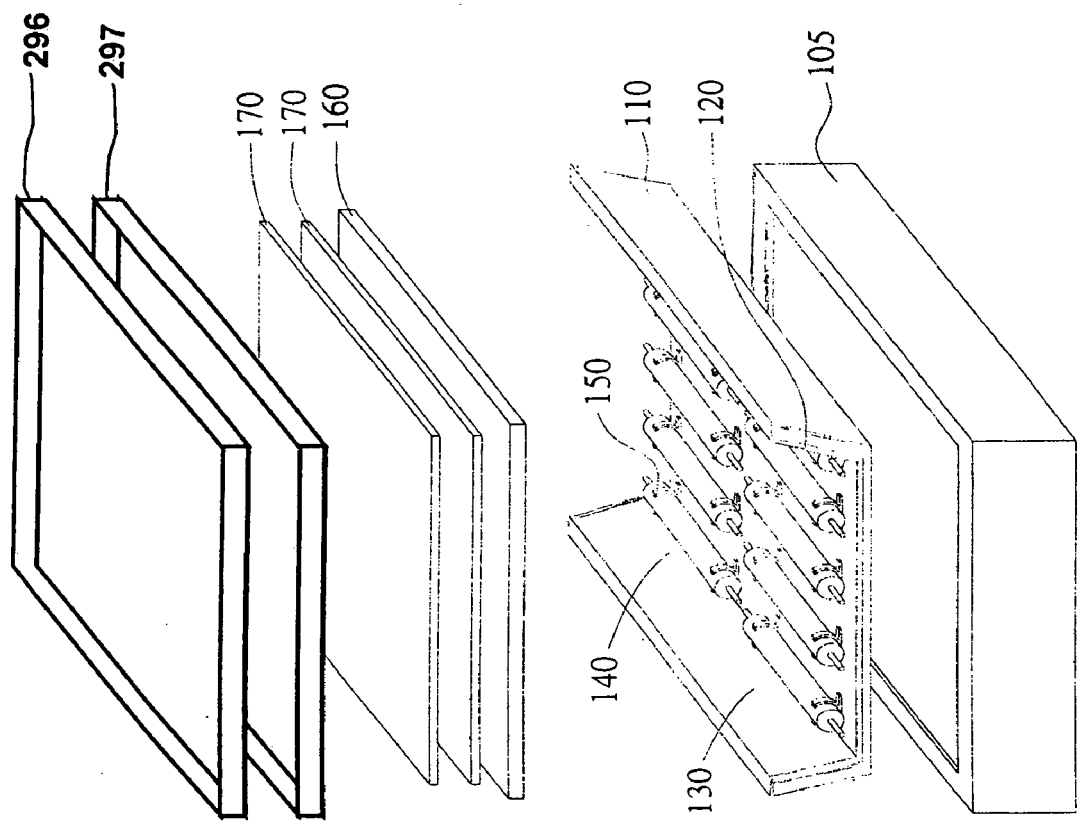
FIG. 2 is an exploded perspective view of a liquid crystal display (LCD) using a backlight module according to a first embodiment of the invention.

FIG. 2 shows an exploded, perspective view of an LCD using a backlight module 100 according to the first embodiment of the invention. The LCD includes a display panel or an LCD panel which, in turn, includes a color filter substrate (CF substrate) 296, and a thin film transistor substrate (TFT substrate) 297. A liquid crystal layer (not shown) is positioned between the CF substrate 296 and the TFT substrate 297. The backlight module 100 according to the first embodiment includes a bezel 110, a reflective sheet 120, a plurality of first lamps 130, a plurality of second lamps 140, a plurality of brackets 150, a diffuser plate 160, a plurality of diffuser sheets 170, and a plastic housing 105. The bezel 110 has an accommodation recess therein. The reflective sheet 120 is disposed on the bottom and the two lateral sides of the accommodation recess. The two ends of each of first lamps 130 and second lamps 140 are respectively nested in two sets of brackets 150 which are disposed in the bezel 110. The diffuser plate 160 and the diffuser sheets 170 convert a linear light source of the lamps into a planar light source. At last, the above components are enveloped with and fixedly supported by the plastic housing 105. The reflective sheet 120 is disposed on the bottom of the bezel 110, in form of an aluminum plate or a steel plate, for instance, and is capable of reflecting the stray light to the image displaying surface to enhance overall light efficiency.

Figure 3:
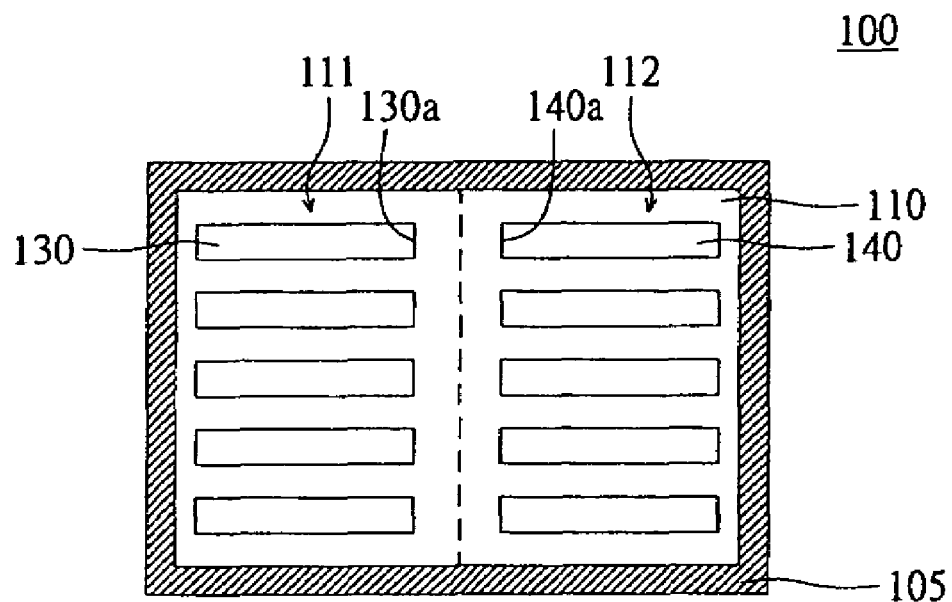
FIG. 3 is a schematic top plan view showing the arrangement of lapms in the backlight module of FIG. 2.

FIG. 3 is a schematic top plan view showing the arrangement of lamps according to the first embodiment of the invention. In the backlight module 100, the bezel 110 has a first light source region 111 and a second light source region 112. The lateral side of the first light source region 111 is adjacent and disposed side by side to the corresponding lateral side of the 15 second light source region 112. Each first lamp 130 is positioned in the first light source region 111 and is arranged substantially in parallel wiht the top side of the bezel 110. Each second lamp 140 is positioned in the second light source region 112 and is arranged substantially in parallel with the top side of the bezel 110. Each first lamp 130 has a first end 130a, and each second lamp 140 has a second end 140a, wherein the first end 130a is respectively adjacent to the second end 140a. For example, each first lamp 130 forms a straight line with the corresponding second lamp 140, and the so aligned first lamp 130 and second lamp 140 together serve as an elongated light source for the backlight module in replacement of a single conventional long lamp. The first lamp 130 and the second lamp 140 arranged in this manner also achieve the object of providing a linear light source. Besides, using multiple short lamps to replace a long lamp as the linear light source further avoids the prior problems of lamp bending and uneven distribution of luminance.

Figure 4:
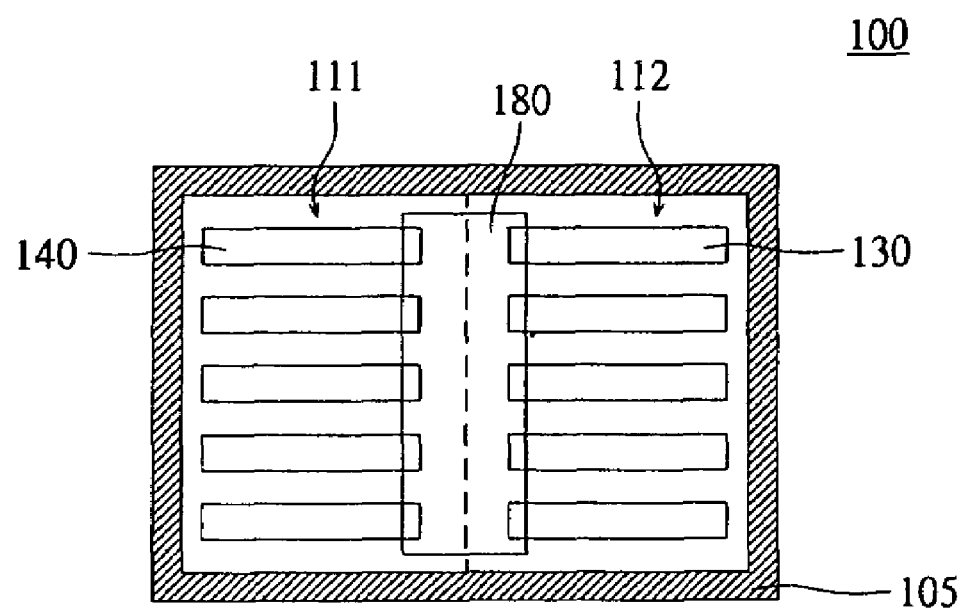
FIG. 4 is a schematic bottom plan view of the backlight module according to the first embodiment of the invention.

FIG. 4 is a schematic bottom plan view of the backlight module according to the first embodiment of the invention. The backlight module 100 further includes an inverter 180 electrically connected to the first lamps 130 and the second lamps 140 for driving the first lamps 130 and the second lamps 140. Thus, even a lamp of ordinary length can be used in a large-scaled monitor, so an inverter of original specification can be used rather than a redesigned inverter in response to the special driving requirements of the long lamp. Preferably, the inverter drives the first lamps 130 and the second lamps 140 by a dual side driving method. Meanwhile, the inverter is disposed between the first lamps 130 and the second lamps 140 but in the back side of the bezel 110, so that the inverter can be disposed in the middle of the bezel. This not only eliminates the conventional problems of the voltage difference and temperature difference being too large, but also avoids voltage leaking and electromagnetic interference problems due to a lengthy high-voltage wire.

Second Embodiment

The present embodiment differs from the first embodiment in the form of the first lamps and the second lamps. Because the other components are the same as those described in the first embodiment, the related description is not repeated herein.

Figure 5:
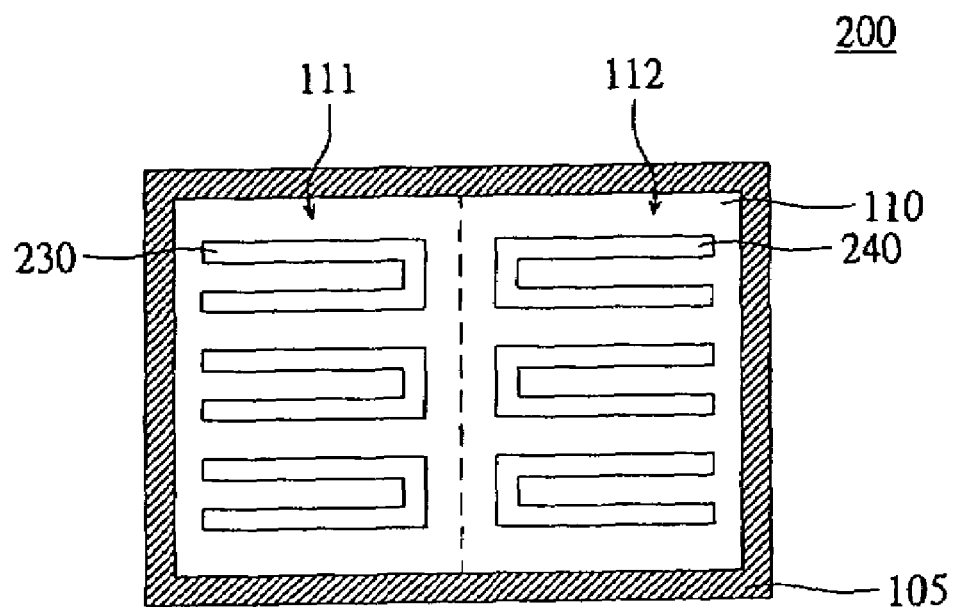
FIG. 5 is a schematic top plan view showing the arrangement of lamps in a backlight module according to a second embodiment of the invention.

FIG. 5 is a schematic top plan view which shows the arrangement of lamps in the backlight module according to the second embodiment of the invention. In the backlight module 200, the first lamps 230 and the second lamps 240 are U-shaped lamps.

Third Embodiment

The present embodiment differs from the first embodiment in the spatial relationship between the first lamps and the second lamps. Because the other components are the same as those described in the first embodiment, the related description is not repeated herein.

Figure 6:
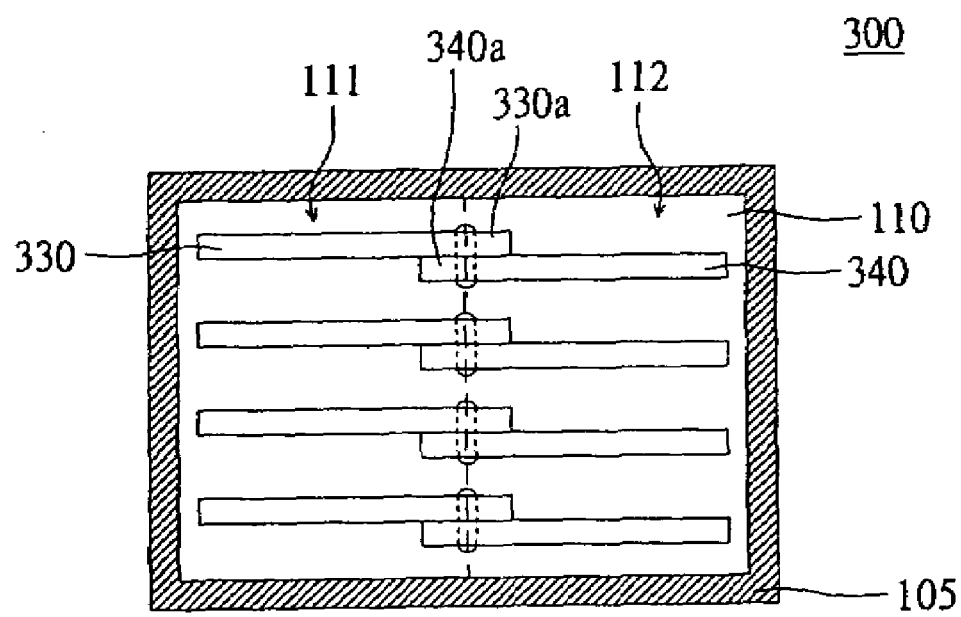
FIG. 6 is a schematic top plan view showing the arrangement of lamps in a backlight module according to a third embodiment of the invention.

FIG. 6 is a schematic top plan view which shows the arrangement of lamps of the backlight module according to the third embodiment of the invention. In the backlight module 300, a plurality of first lamps 330 are arranged substantially in parallel to each other and spaced at an interval, and the second lamps 340 correspond to the first lamps 330 and are spaced at the same interval as the first lamps 330, so that the first lamps 330 and the second lamps 340 are alternately arranged on the bezel. The adjacent ends 330a, 340a of each first lamp 330 and the corresponding second lamp 340, respectively, are placed side by side and held together on the bezel, whereby the first lamp 330 and the corresponding second lamp 340 together form a combined, long lamp.

Thus, the present embodiment assembles two short lamps horizontally to replace a long lamp extending from the left end to the right end of the backlight module. However, more than two short lamps can be assembled in the present embodiment to achieve the same object.

Fourth Embodiment

The present embodiment differs from the first embodiment in the design of the bezel. Because the other components are the same as those described in the first embodiment, the related description is not repeated herein.

Figure 7A:
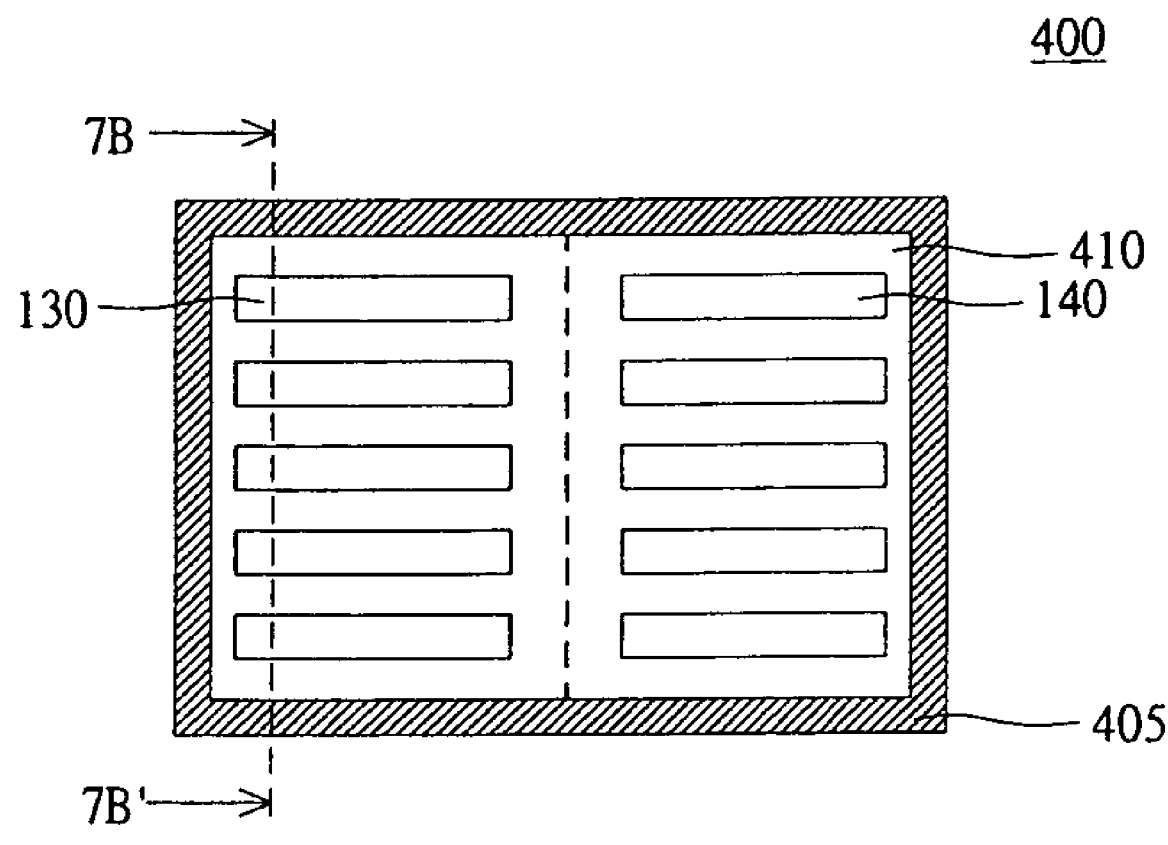
FIG. 7A is a schematic top plan view of a backlight module according to a fourth embodiment of the invention.
Figure 7B:
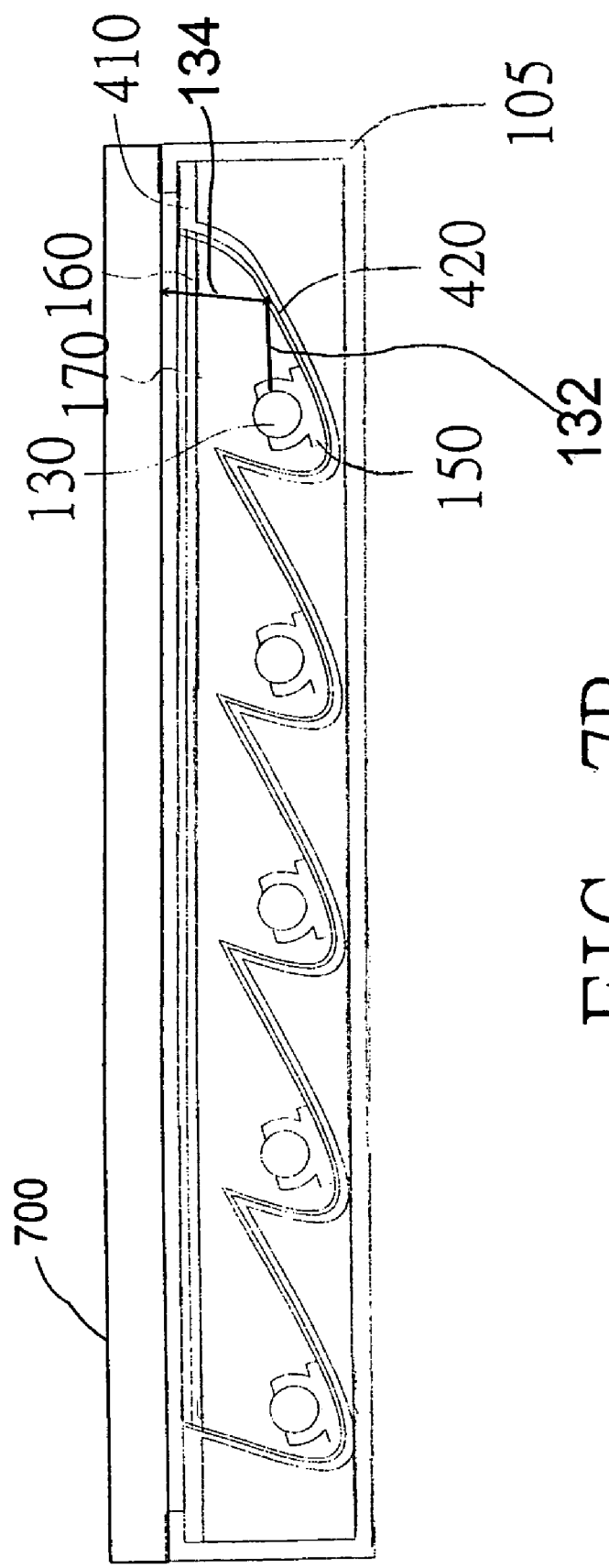
FIG. 7B is a cross-sectional view taken along the sectional line 7B-7B' of FIG. 7A additionally showing a display panel.

FIG. 7A is a schematic top plan view of the backlight module according to the fourth embodiment of the invention, while FIG. 7B is a cross-sectional view taken along the sectional line 7B-7B' of FIG. 7A additionally a display panel 700 which, in an embodiment, is similar to the display panel described above with reference to FIG. 2. In backlight module 400, the bezel 410 has a curved surface, and the first lamps 130 are disposed in the recesses of the curved surface. As a result, the distance(s) 132 that light travels from the first lamp 130 to the reflective sheet 420 is the same as the distance(s) 134 that the reflected light travels from the reflective sheet 420 upward to the display panel 700, so that the luminance of the backlight source is uniform. The bezel 410 preferably has a double curved surface. However, anyone of ordinary skill in the art would understand that the bezel of the present embodiment can have a convex surface, a concave surface, a parabolic surface or an irregular curved surface.

Fifth Embodiment

The present embodiment differs from the first embodiment in the design of the bezel and its components. Because the other components are the same as those described in the first embodiment, the related description is not repeated herein.

Figure 8A:
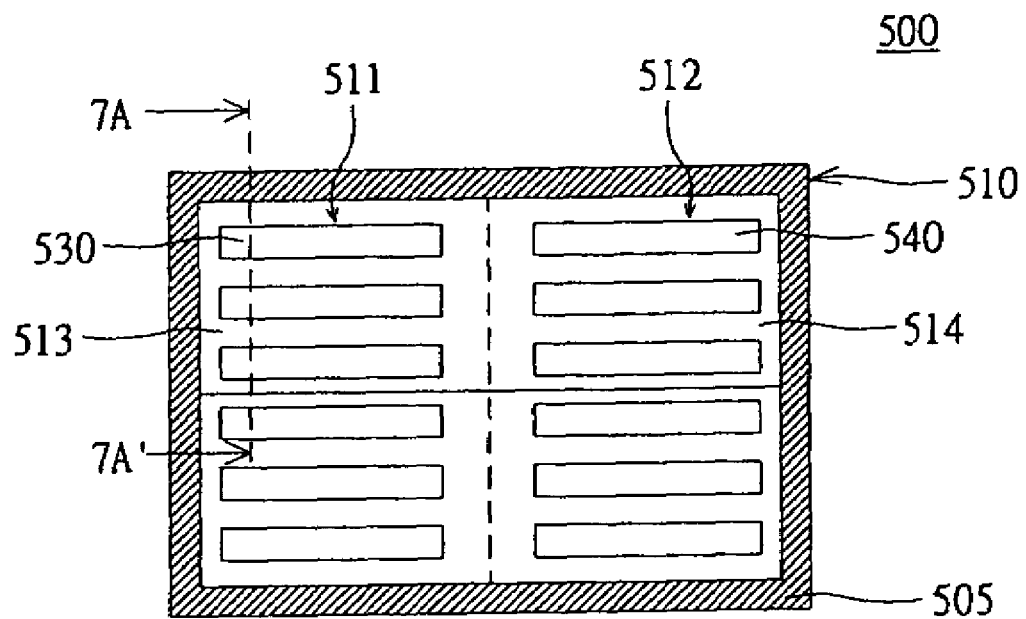
FIG. 8A is a schematic top plan view of a backlight module according to a fifth embodiment of the invention.

FIG. 8A is a schematic top view of the backlight module according to the fifth embodiment of the invention. In the backlight module 500, the bezel 510 comprises four bezel units, only the upper two of which are designated as 513, 514, respectively, in FIG. 8A, whereas the lower two bezel units are configured similarly to the upper bezel units 513, 514, respectively. The bezel units are closely connected together and are enveloped by a plastic housing 505 defining the shape of the backlight module. In the bezel 510, the lateral side of the first bezel unit 513 is connected to the adjacent, lateral side of the second bezel unit 514 side by side, as will be described with respect to FIG. 9. The first bezel unit 513 forms part of the first light source region 511, with the other part being formed by the first one 513a of the lower, unnumbered bezel units, and has a number of the first lamps 530 disposed thereon. The second bezel unit 514 forms part of the second light source region 512, with the other part being formed by the second one (unnumbered) of the lower, unnumbered bezel units, and has a number of the second lamps 540 disposed thereon.

Figure 8B:
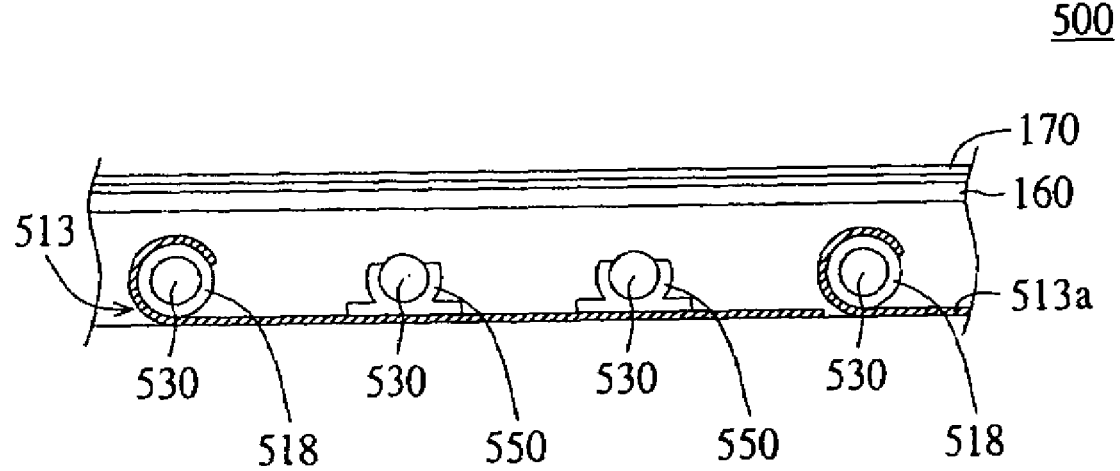
FIG. 8B is a cross-sectional view taken along the sectional line 8B-8B' of FIG. 8A.

FIG. 8B is a cross-sectional view taken along the sectional line 8B-8B' of FIG. 8A. In the backlight module 500, several brackets 550 are disposed on each of the bezel units, such as 513 shown in FIG. 8B, and used for holding the corresponding lamps, such as first lamps 530 shown in FIG. 8B, onto the respective bezel unit, e.g., 513. Besides, the first bezel unit 513 tightly presses the corresponding lower bezel unit, i.e., 513a. Likewise, the second bezel unit 514 tightly presses its corresponding lower bezel unit.

Figure 9:
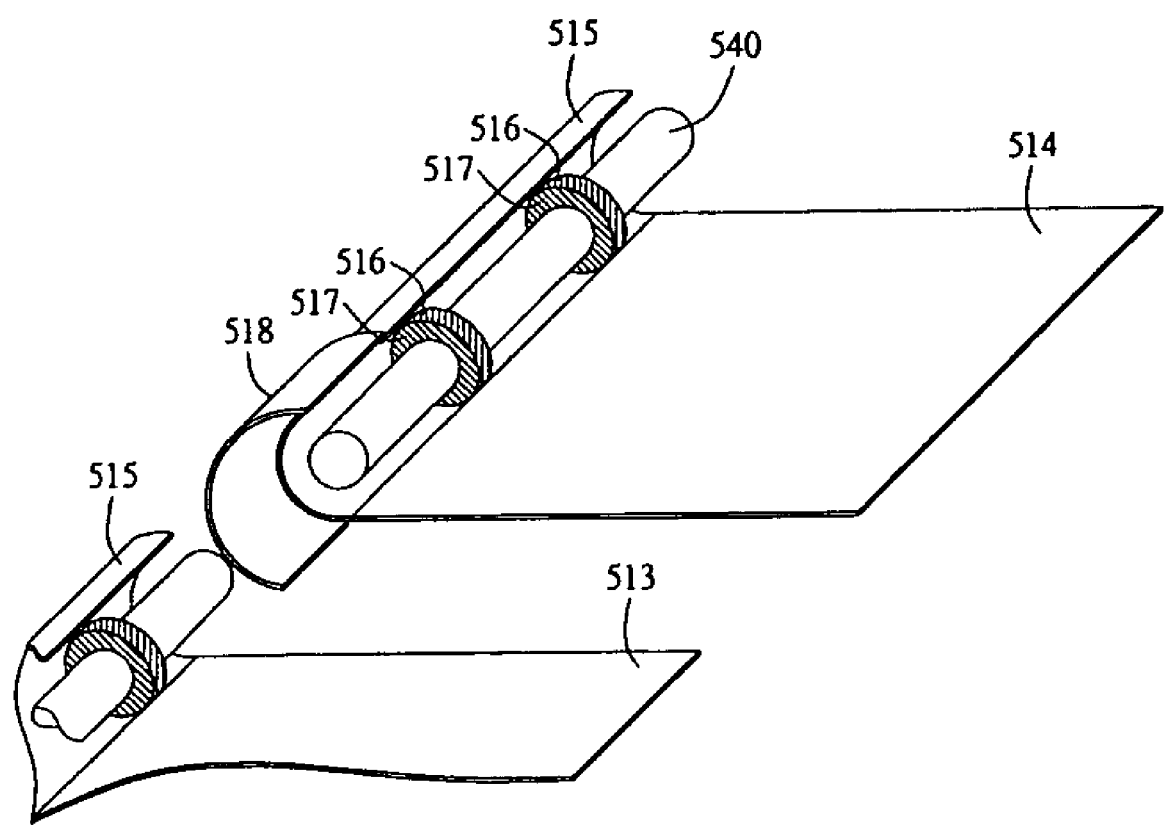
FIG. 9 is a perspective view showing the second bezel unit of FIG. 8A.

FIG. 9 is a a perspective view which shows the second bezel unit 514 of FIG. 8A. The second bezel unit 514 includes an extension portion 515, two fixing pieces 516, and a holding portion 518. The extension portion 515, such as an arced metal plate, is projected from one side of the second bezel unit 514, and forms an accommodation space. The two fixing pieces 516 are held in the extension portion 515. Each of the two fixing pieces 516 respectively has a through hole 517, and one of the second lamps 540 is received in the two through holes 517 to fix the second lamp 540 in the extension portion 515. The fixing pieces 516 can be rubber caps that envelop the electrode part of the lamp. Preferably, the extension portion 515 and the second bezel unit 514 are formed in one piece. The holding portion 518 is projected from a lateral side of the second bezel unit 514 towards the first bezel unit 513. When assembling the first bezel unit 513 and the second bezel unit 514, the holding portion 518 overlaps the extension portion 515 of the first bezel unit 513, so that the first bezel unit 513 is held within the holding portion 518 of the second bezel unit 514.

Besides, a first inverter and a second inverter (not shown) are positioned in the first bezel unit 513 and the second bezel unit 514 respectively for driving the corresponding numbers of the first lamps 530 and the second lamps 540, respectively. In this embodiment, each bezel unit is an luminous assembly with a detachable bezel, a reflective sheet and lamps driven separatively. If one of the bezel units of the backlight module according to the present embodiment is damaged, it can be replaced by a undamaged replacement bezel unit instead of changing the whole backlight module. Consequently, the repair cost of the product is greatly reduced and the lifespan of the backlight module is largely prolonged.

Furthermore, the bezel 510 according to the present embodiment is not limited to being divided into two or four bezel units. The bezel can be divided into any number of bezel units. For example, the bezel may have a plurality of bezel units arranged in matrix with a plurality of lamps being respectively disposed thereon. Moreover, the arrangements of lamps, including the above disclosed matrix arrangement (e.g., FIGS. 3-5) and alternate arrangement (e.g., FIG. 6), are also applicable in this embodiment. The same effect can be achieved by dividing the bezel into more than two bezel units according to the size and shape of the display panel, or by arranging the lamps on the bezel units according to the above principles.

The light source of the backlight module disclosed in the above embodiments of the invention is formed by connecting several lamps side by side or end to end and is ideally applicable to large-scaled display panels. Compared with the conventional arrangement with each of the lamps extending all the way from the left end to the right end of the monitor, each lamp of the combined type of lamps according to the invention has a shorter length, thus avoiding lamp bending and/or rupture due to gravity. Moreover, since the lamps disposed in the backlight module of the invention have an uniform distribution of mercury, and the temperature and voltage difference at the two ends of each lamp is relatively small, the luminance uniformity of the backlight module can be largely improved. Besides, the driving method of present invention is easy and does not need to be redesigned, further reducing manufacturing costs. Furthermore, the backlight module of the invention further provides a combined assembly of bezel and lamp(s), which not only has the display quality disclosed above, but also offers the advantages of easy replacement and maintenance of the backlight module, thereby largely prolonging product lifespan and complying with environmental conservation and sustained utilization.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
  a first light source region and a second light source region disposed side by side;
  at least one first elongated lamp positioned in the first light source region; and
  at least one second elongated lamp positioned in the second light source region;
  wherein a longitudinal direction of the second lamp is substantially aligned with a longitudinal direction of the first lamp;
  wherein a first lamp support unit and a second lamp support unit are disposed in the first light source region and the second light source region, respectively, each of said lamp support units comprising:
    a plate;
    an extension portion projecting upwardly from an end of the plate and forming an accommodation space; and
    two fixing pieces held in the accommodation space, wherein each of the two fixing pieces respectively has a through hole, and the at least one first or second lamps is received in the two through holes, so that the at least one first or second lamp is fixed within the extension portion;
  wherein the second lamp support unit further comprises a holding portion projecting from the extension portion thereof toward the first lamp support unit; and
  wherein the first lamp support unit and the second lamp support unit are assembled together with the extension portion of the first lamp support unit being nested in and held within the holding portion of the second lamp support unit.

2. The backlight module according to claim 1, wherein each of the at least one first lamp and the corresponding second lamp have adjacent ends.

3. The backlight module according to claim 1, wherein each of the at least one first lamp and the corresponding second lamp form a straight line.

4. The backlight module according to claim 1, further comprising a first inverter and a second inverter which are deposited in the first lamp support unit and the second lamp support unit, respectively, for driving the first and second lamps, respectively.

5. The backlight module according to claim 1, wherein
  the extension portion, the holding portion and the plate of the second lamp support unit are formed in one piece; and
  the extension portion and the plate of the first lamp support unit are formed in one piece.

6. The backlight module according to claim 1, wherein the extension portion of each of said first and second lamp support units is curved and defines the respective accommodation space as a substantially cylindrical space in which the two fixing pieces, which are annular in shape, are held.

7. The backlight module according to claim 1, wherein each of the first and second lamp support units further comprises
  two brackets disposed on the plate, and
  a further first or second elongated lamp the two ends of which are respectively nested in the two brackets, so that the further first or second lamp is held on the plate in parallel to the first or second lamp that is held by the extension portion;
  wherein the further first and second lamps are substantially longitudinally aligned.

8. The backlight module according to claim 1, further comprising:
  a reflective sheet adhered on each of the first and second lamp support units and positioned between said first or second lamp support unit and the respective first or second lamp;
  a diffuser plate disposed above the first lamp and the second lamp; and
  a plurality of diffuser sheets disposed on the diffuser plate.

9. A liquid crystal display (LCD), comprising:
  a TFT substrate;
  a CF substrate; and
  a backlight module, comprising:
    a first light source region and a second light source region disposed side by side;
    at least one first elongated lamp positioned in the first light source region; and
    at least one second elongated lamp positioned in the second light source region;
    wherein a longitudinal direction of the second lamp is substantially aligned with a longitudinal direction of the first lamp;
    wherein a first lamp support unit and a second lamp support unit are disposed in the first light source region and the second light source region, respectively, each of said lamp support units comprising:
      a plate:
      an extension portion projecting upwardly from an end of the plate and forming an accommodation space; and
      two fixing pieces held in the accommodation space, wherein each of the two fixing pieces respectively has a through hole, and the at least one first or second lamps is received in the two through holes, so that the at least one first or second lamp is fixed within the extension portion;
    wherein the second lamp support unit further comprises a holding portion projecting from the extension portion thereof toward the first lamp support unit; and
    wherein the first lamp support unit and the second lamp support unit are assembled together with the extension portion of the first lamp support unit being nested in and held within the holding portion of the second lamp support unit.

10. The LCD according to claim 9, wherein each of the at least one first lamp and the corresponding second lamp have adjacent ends.

11. The LCD according to claim 9, wherein each of the at least one first lamp and the corresponding second lamp form a straight line.

12. The LCD according to claim 9, wherein
said backlight module further comprises a first inverter and a second inverter which are deposited in the first lamp support unit and the second lamp support unit, respectively, for driving the first and second lamps, respectively.

13. The LCD according to claim 9, wherein
the extension portion, the holding portion and the plate of the second lamp support unit are formed in one piece; and
the extension portion and the plate of the first lamp support unit are formed in one piece.

14. The LCD according to claim 9, wherein the extension portion of each of said first and second lamp support units is curved and defines the respective accommodation space as a substantially cylindrical space in which the two fixing pieces, which are annular in shape, are held.

15. The LCD according to claim 9, wherein each of the first and second lamp support units further comprises
two brackets disposed on the plate, and
a further first or second elongated lamp the two ends of which are respectively nested in the two brackets, so that the further first or second lamp is held on the plate in parallel to the first or second lamp that is held by the extension portion;
wherein the further first and second lamps are substantially longitudinally aligned.

16. The LCD according to claim 9, wherein the backlight module further comprises:
a reflective sheet adhered on each of the first and second lamp support units and positioned between said first or second lamp support unit and the respective first or second lamp;
a diffuser plate disposed above the first lamp and the second lamp; and
a plurality of diffuser sheets disposed on the diffuser plate.

17. A backlight module, comprising:
a first light source region and a second light source region disposed side by side;
at least one first elongated lamp positioned in the first light source region; and
at least one second elongated lamp positioned in the second light source region; wherein
a longitudinal direction of the second lamp is substantially aligned with a longitudinal direction of the first lamp;
said backlight module further comprises a lamp support plate having a curved surface and supporting thereon at least one of the first and second lamps.

18. The backlight module according to claim 17, wherein
the curved surface of the lamp support plate defines a plurality of elongated recesses in each of which one of the first and second lamps is held.

19. The backlight module according to claim 18, wherein
the curved surface of the lamp support plate is wavy in cross section.

20. The backlight module according to claim 18, further comprising:
a reflective sheet adhered to said lamp support plate and positioned between said lamp support plate and the first or second lamp supported by said lamp support plate.

21. A liquid crystal display (LCD), comprising a backlight module according to claim 17 and a LCD panel disposed above said backlight module.

22. The display according to claim 21, wherein
the curved surface of the lamp support plate defines a plurality of elongated recesses in each of which one of the first and second lamps is held.

23. The display according to claim 22, wherein
the curved surface of the lamp support plate is wavy in cross section.

24. The display according to claim 21, wherein
said backlight module further comprises a reflective sheet adhered to said lamp support plate and positioned between said lamp support plate and the first or second lamp supported by said lamp support plate; and
a distance that light travels from the first or second lamp supported by said lamp support plate to the reflective sheet is substantially equal to a distance that light reflected off said reflective sheet travels from said reflective sheet to said LCD panel.

* * * * *